Patented Oct. 21, 1952

2,614,924

UNITED STATES PATENT OFFICE 2,614,924

COMPOSITION FOR FABRICATING PAPER AND A PROCESS OF MAKING IT

Bernard Chiego, Newark, N. J., assignor, by direct and mesne assignments, of ten per cent to Frank Gardner, Baltimore, Md., and eighty per cent to Albion D. T. Libby, Newark, N. J.

No Drawing. Application March 8, 1949, Serial No. 80,317

6 Claims. (Cl. 92—14)

This invention relates to a method for making a composition for fabricating paper and the composition itself.

Since our forests are being rapidly stripped for timber and wood pulp it becomes harder each year to get good wood pulp for making paper. It is therefore the principal object of my present invention to utilize, what is now waste products, for the manufacture of good quality of paper. At the present time, so far as I have been able to ascertain, corn cobs are available in quantity around 20,000,000 tons annually in the main corn producing States in the U. S. A. It is therefore readily seen that if this great quantity of corn cobs can be utilized in combination with wood pulp for making paper and other products, then a large percentage possibly as high as fifty, of wood now used for pulp can be saved and give our trees a chance to grow into timber. Corn cobs contain much extraneous matter besides the two major constituents of Cellan which are cellulose and xylan. In air dried corn I have found that, in addition to much coloring matter, they contain 6 to 7% moisture, 9 to 10% water soluble extractives about 3 to 4% of which is of a sugar nature mainly xylose and around 1% of other matter consisting mainly of lignin, albuminoids, etc.

I have found after much study and experiments that corn cobs and bagasse can be treated in a manner so that when added to regular wood pulp it will produce a strong and highly satisfactory paper, at a lower cost.

In order to achieve the production of the end products desired namely, Cellan, I have found it was necessary to establish suitable conditions for the extraction of all those materials exclusive of the cellulose-xylan complex designated as Cellan.

During the course of my studies and tests, it was found that two satisfactory methods could be used to produce Cellan. One of these methods in general comprises first reducing the cobs to pass through 5 to 80 screen mesh, then cooking the ground up corn cobs with caustic alkali in an aqueous concentration of .5% to 1.5% and preferably at 1% at the boiling point and also preferably without pressure using 9 to 10 volumes of the alkali solution based on the weight of the cobs. Under these conditions it was found that the lignin, albuminoids and other extractives could be easily removed in a maximum cooking of 30 minutes without any substantial loss of the cellulose-xylan complex which I call Cellan. I further found that after maintaining the cooking condition at 212° F. for about 5 minutes an exothermic reaction took place which elevates the temperature of the mass to 218–220 degrees F. Concomitant with this exothermic reaction there is a neutralization of some 25% of the alkali originally employed. The cooked material is then washed free of black liquor and is then bleached, rewashed and dried. The end product Cellan, is a white granular material which may be ground to a suitable size. The Cellan yield by this method is approximately 62.5% on the basis of the original cob containing 6 to 7% moisture. Briefly this method can be summarized into three steps as follows:

Method 1

Step 1.—Reducing the corn cobs to a particle size (5 to 80 screen mesh) in the order of 1 ton, 1% NaOH solution in the order of 9 to 10 tons, cook for 30 minutes at 212 degrees F.

Step 2.—Wash free of black liquor and bleach in NaOCl solution containing 5.5% Cl on basis of amount of mesh.

Step 3.—Wash free of bleach solution, dry and pulverize to suitable size. The final product is Cellan suitable for the paper industry as well as other industrial uses.

Method 2

Step 1.—Treat 1 ton of cob particles 5 to 80 screen mesh with 10 tons of boiling water at 15 pounds steam gauge pressure for 30 minutes and filter. The filtrate contains about 9.36% of solids based on the weight of cobs used and this solution may be used directly for fermentation as will be later referred to. The residue, the water extracted cob mesh, is saved for step 2 for the manufacture of Cellan.

Step 2.—The water extracted cob mesh or residue from step 1 is then cooked with 1% of NaOH solution as in Method 1 and continued as in steps 2 and 3 of Method 1.

When Method 2 is used the chlorine bleach requirements are cut in half. Thus the chlorine required is only 2.6% of the cob mesh weight when Method 2 is used as contrasted to a chlorine requirement of 5.3% of the cob mesh weight when Method 1 is used.

This second method was arrived at after consideration of the valuable materials obtained in the black liquor from Method 1. This black liquor was found to contain some 22% solids based on the original cob, corrected for NaOH. Of this quantity 3.3% is represented by reducing sugars determined by the Munson-Walker method and based on the original cob weight. The greater proportion of these sugars is xylose which is not fermentable by the usual Saccharomyces yeasts; however, this sugar is utilized by *Torula utilis* which can be used to produce food yeast since it is rich in the B complex, fats and proteins. In addition, the black liquor, upon neutralization with sulfuric acid, will support mould growth and can be used to grow various species of streptomyces of the Griseus strain for the production of materials rich in the B-12 factor cobalt complex sometimes referred to as the A. P. F. or animal protein factor, valuable in the treatment of pernicious anemia.

Method No. 2 was evolved to obtain two additional benefits namely,

1. Lower the chlorine bleach demand in Method No. 1,
2. Obtain a filtrate from the pressure water cook of step No. 1 which filtrate may be directly fermented by *Torula utilis* etc.. for the manufacture of food yeast for farmers and others.

Thus Method No. 2 differs from Method No. 1 only in the pressure cooking of the cobs with water alone as a first step (at 15 lbs. steam gauge pressure) prior to proceeding as in Method No. 1.

Having thus described my invention what I claim is:

1. The process for producing a composition of the character described, consisting in reducing cellulosic material of the class consisting of corn cobs and bagasse, to a particle size that will pass through screens from 5 to 80 mesh, then mixing in the proportion of approximately 1 part of said reduced material with 9 to 10 parts of 1% water solution of NaOH, then cooking the mixture for approximately 30 minutes at near 212 degrees F., then washing out the black liquid and bleaching the solid residue in a NaOCl solution, then washing said residue free of bleach solution, then drying and pulverizing it and mixing it with wood pulp.

2. The process for producing a composition of the character described consisting in reducing cellulosic material of the class consisting of corn cobs and bagasse, to a particle size that will pass through screens from 5 to 80 mesh, then mixing in the proportion of approximately 1 part of said reduced material with approximately 10 parts of water, then maintaining the mixture for approximately 30 minutes in hot water under 15 lbs. steam gauge pressure, then filtering and collecting the extract which contains approximately 9.36 per cent of solids based on the weight of said cellulosic material used, then cooking the extracted material with a 1% NaOH solution for 30 minutes at 212 degrees F., then washing out the black liquor and discarding same, then bleaching the residue in a NaOCl solution, then washing this residue free of the bleach solution, then drying and pulverizing said residue and mixing it with wood pulp.

3. The process of producing a composition of the class described, consisting in reducing cellulosic material of the class consisting of corn cobs and bagasse, to a particle size satisfactory for cooking, then cooking the reduced material in a .5 per cent to 1.5 per cent water solution of caustic soda of not more than ten times the weight of the cobs used and at a temperature of 212 to 220 degrees F., for approximately 30 minutes, then washing out the black liquor, bleaching the residue and then washing it, then drying and grinding the residue to powder and mixing it with wood pulp.

4. The process of producing a composition of the class described consisting in reducing one of the group consisting of corn cobs and bagasse to a suitable size, then treating the ground material in hot water in amount substantially ten times the weight of the ground material and under a steam gauge pressure of around 15 pounds for substantially 30 minutes, then separating out the free liquor and then treating the residue with a one per cent solution of NaOH in the amount of ten volumes to one volume of ground material, extracting the black liquor and discarding the same, then bleaching the residue and washing it free of the bleaching liquor, drying the residue, reducing it to a suitable size and mixing it with wood pulp.

5. A composition for making paper consisting of about 50% of paper pulp and about 50% of a residue obtained from treating one of the group consisting of corn cobs and bagasse by grinding the said one into a suitable mesh size, then treating the ground material in approximately a 1% water solution of caustic soda at a temperature of about 212 to 220 degrees F. for about 30 minutes, then washing out the black liquor, then bleaching and drying the residue ready for use.

6. A composition for the purpose described consisting of wood pulp and an end product residue of white granular material, the main constituents of which are obtained from cellulosic material of the class including corn cobs and bagasse, said residue material being obtained by grinding the cobs or bagasse to a suitable mesh size, then treating the ground material in the ratio of 1 part ground material to 10 parts of water at 15 pounds steam gauge pressure for about 30 minutes, then filtering and cooking the residue in a 1% NaOH solution, then washing free of black liquor, then bleaching, drying and pulverizing to the size desired.

BERNARD CHIEGO.

REFERENCES CITED

The following references are of record in the file of this patent:

UNITED STATES PATENTS

| Number | Name | Date |
|---|---|---|
| Re. 1,448 | Ladd et al. | Apr. 7, 1863 |
| 346,799 | Bastet | Aug. 3, 1886 |
| 720,850 | Sherwood | Feb. 17, 1903 |
| 922,822 | Stewart | May 25, 1909 |
| 1,456,540 | Ditman | May 29, 1923 |
| 1,825,307 | Darling | Sept. 29, 1931 |
| 1,941,817 | Sweeney et al. | Jan. 2, 1934 |
| 2,073,616 | Acree | Mar. 16, 1937 |

FOREIGN PATENTS

| Number | Country | Date |
|---|---|---|
| 1,359 | Great Britain | 1856 |
| 497,477 | Great Britain | Dec. 16, 1938 |

OTHER REFERENCES

Wise: "Wood Chemistry," 1946, pg. 102.